United States Patent
Chan et al.

(10) Patent No.: US 7,542,252 B2
(45) Date of Patent: Jun. 2, 2009

(54) CIRCUIT INTERRUPTING DEVICE HAVING INTEGRATED ENHANCED RFI SUPPRESSION

(75) Inventors: David Y. Chan, Bellerose, NY (US); Eugene Shafir, Jamaica Estates, NY (US); Mario Angelides, Rockville Centre, NY (US); Roger M. Bradley, North Bellmore, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 357 days.

(21) Appl. No.: 11/421,639

(22) Filed: Jun. 1, 2006

(65) Prior Publication Data
US 2006/0274462 A1 Dec. 7, 2006

Related U.S. Application Data

(60) Provisional application No. 60/686,167, filed on Jun. 1, 2005.

(51) Int. Cl.
*H02H 3/00* (2006.01)

(52) U.S. Cl. ......................................................... 361/42
(58) Field of Classification Search ..................... 361/42
See application file for complete search history.

(56) References Cited

U.S. PATENT DOCUMENTS

| 5,303,113 | A | 4/1994 | Goleman et al. |
| 5,510,945 | A | 4/1996 | Taylor et al. |
| 6,466,424 | B1 | 10/2002 | Larranaga et al. |
| 7,375,935 | B2 * | 5/2008 | Chan et al. ............... 361/42 |

* cited by examiner

*Primary Examiner*—Stephen W Jackson
(74) *Attorney, Agent, or Firm*—Carter, DeLuca, Farrell & Schmidt, LLP

(57) ABSTRACT

A circuit interrupting device such as a GFCI having a network of feed-through capacitors and other passive elements for providing enhanced Radio Frequency Interference (RFI) suppression where the feed-through capacitors and the other passive elements are integrated into a multilayer capacitor chip, also referred to as a Network Capacitor which is located between a differential transformer and at least one input terminal of an operational amplifier on an integrated circuit chip of the GFCI circuit.

29 Claims, 4 Drawing Sheets

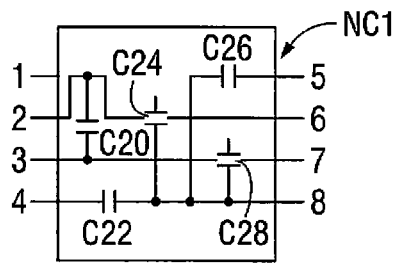
FIG. 2
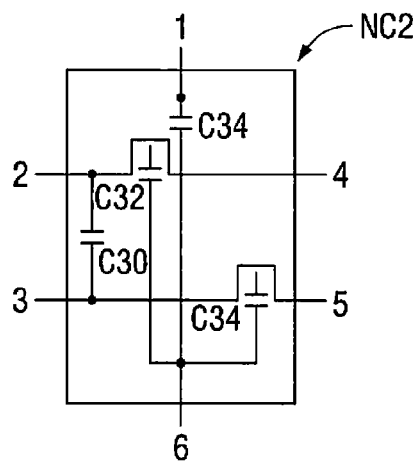
FIG. 3
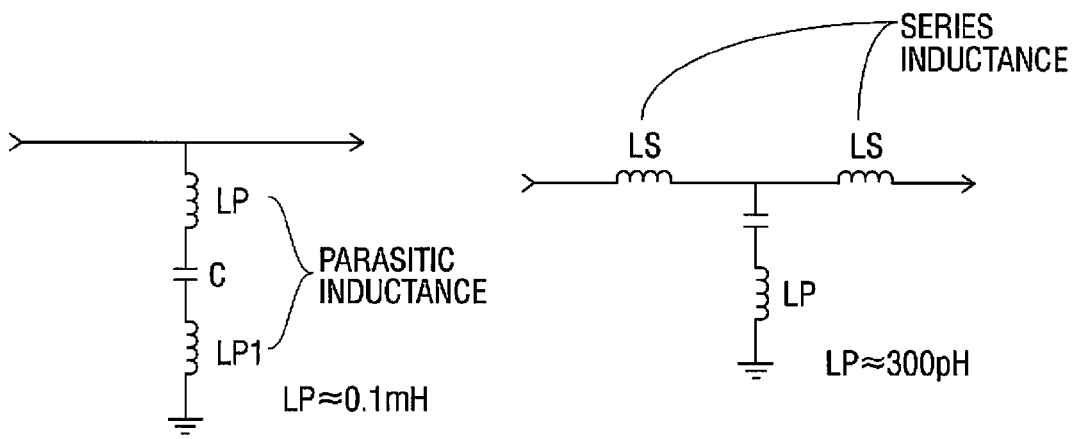
FIG. 4A     FIG. 4B

CIRCUIT INTERRUPTING DEVICE HAVING INTEGRATED ENHANCED RFI SUPPRESSION

This application claims the benefit of the filing date of a provisional application having application Ser. No. 60/686,167, which was filed on Jun. 1, 2005.

FIELD OF THE INVENTION

The present invention relates to circuit interrupting devices and, more particularly, to ground fault circuit interrupter (GFCI) circuits having enhanced Radio Frequency Interference (RFI) suppression.

BACKGROUND OF THE INVENTION

Within the home and workplace, Ground Fault Circuit Interrupters (GFCI's) designed to interrupt power provided to various loads, such as household appliances, consumer electrical products and branch circuits are in high demand. Specifically, electrical housing code regulations in most states require that new housing construction have bathrooms and kitchens equipped with Ground Fault Circuit Interrupters (GFCI). Circuit interrupting devices, such as the GFCI device described in commonly owned U.S. Pat. No. 4,595,894 and incorporated herein in its entirety by reference, use a trip mechanism to mechanically break an electrical connection between an input and one or more output conductors, when, for example, a ground fault is sensed by a sensing circuit incorporated within the circuit interrupting device.

The sensing circuit typically incorporates a high turn ratio differential transformer connected to detect the difference of current in the neutral and phase wires of an electrical distribution system. The secondary of the differential transformer is connected to an input of a high gain operational amplifier (OA) on a chip having an integrated circuit for detecting ground faults. The high gain operational amplifier provides an amplified signal which is proportional to the differential of line and phase current and this signal is used to control a silicon controlled rectifier (SCR).

Ideally, under a ground fault condition, the amplified signal will exceed a certain predetermined reference level and enable a triggering device such as the SCR to effect the operation of a relay coil assembly, such that the contacts of the relay coil assembly will open to disconnect the load from the line. Noise, radio signals, RF producing equipment such as cell phones, and other phenomena (either radiated in free space or conducted within the electrical distribution system), can affect the operation of GFCI circuits. In particular, electromagnetic interference (EMI) having radio frequency interference (RFI) signals which are within a specific radio frequency band may effect the operation of the GFCI circuit. This can occur when spurious energy is coupled to the inputs of the high gain operational amplifier. This coupling can begin with the current carrying conductors in the electrical distribution system itself. The conductors can either carry conducted noise from a source connected to some other branch of the system, or they can act as antennas, or receptors, to convert radiated signals (such as radio waves) into conducted signals within the electrical distribution system. These spurious signals may then be coupled from the line conductors to the secondary winding of the differential transformer.

Once the spurious signals are coupled into the secondary winding of the transformer, they are conducted through circuitry to the inputs of the operational amplifier where a component of the signal can influence the operation of the amplifier in such a way to either increase or decrease the functional ground-fault sensitivity which may create nuisance or false tripping of a GFCI.

More particularly, an AC coupling capacitor, typically connected at the input of the operational amplifier, charges up when a transient signal appears on the differential transformer. When the impedance in the discharge path of this AC coupling capacitor is low, the AC coupling capacitor will discharge rapidly. Conventionally, however, the only impedance in the discharge path that exists is the inherent impedance located at the input of the operational amplifier which is normally very high. Thus, the AC coupling capacitor will discharge slowly and a false signal that is received at the operational amplifier may trip the GFCI.

Alternatively, nuisance tripping under no-load, no fault conditions may exist in extreme cases. As a result, this increased ground-fault sensitivity may increase the ground-fault threshold trip to above 6 milliamps, which is the present industry standard for the upper limit for ground fault threshold. Another result is that the GFCI device will not trip in the presence of a 2 ohm grounded neutral loop, which is the standard for the highest loop impedance for tripping. In extreme cases, it is theoretically possible that the GFCI will be rendered inoperable.

Other critical components in a GFCI circuit that are sensitive to RFI include the silicon controlled rectifier (SCR) and the power supply. Thus, a need exists for a circuit interruption device that has improved immunity to noise interference such as EMI and RFI interference.

The present invention is directed to overcoming, or at least reducing the effects of one or more of the problems set forth above.

SUMMARY OF THE INVENTION

To address the above noted deficiencies of circuit interrupting devices, the present invention discloses a circuit interrupting device that includes a capacitor network circuit which provides enhanced RFI suppression. The capacitor network circuit can comprise feed-through capacitors and other passive components integrated into a multilayer capacitor chip, also known as a network capacitor. With reference to the objective of providing circuit interrupting devices and related products with enhanced RFI suppression, the multilayer capacitor chip incorporated within the design of the sensing circuit is provided to eliminate RFI in circuit interrupting devices. In particular, by placement of a feed-through capacitor in sensitive locations of the circuit interrupting device, RFI is suppressed. The critical components in a circuit interrupting device that may be sensitive to RFI include the Operational Amplifier (OA), differential transformer, silicon controlled rectifier (SCR), and power supply. Depending on the application, a feed-through capacitor may be placed in these sensitive locations to suppress RFI.

More particularly, the present invention is directed to a network capacitor in a circuit interrupting device having a differential transformer and a circuit interrupting portion. The transformer generates a signal in response to an imbalance of current flow in the phase and neutral conductors which are between the input terminals and the load terminals of a GFCI. The circuit interrupting portion generates a switching signal in response to the signal. The circuit interrupting portion includes a multilayer capacitor chip having feed-through capacitors and other passive components that provides enhanced radio frequency interference (RFI) suppression. The switching signal from an integrated circuit chip such as the LM-1851 chip manufactured by National Semiconductor is fed to an SCR which conducts current to energize a relay coil which is part of a trip mechanism used to mechanically break the electrical connection between an input and at least one output terminal of the GFCI.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals:

FIG. 2 shows a network capacitor in accordance with the principles of the invention;

FIG. 3 shows another embodiment of a network capacitor;

FIG. 4A shows the equivalent circuit of a standard capacitor;

FIG. 4B shows the equivalent circuit of a feed through capacitor;

DESCRIPTION OF THE PREFERRED EMBODIMENTS

Figure 1:
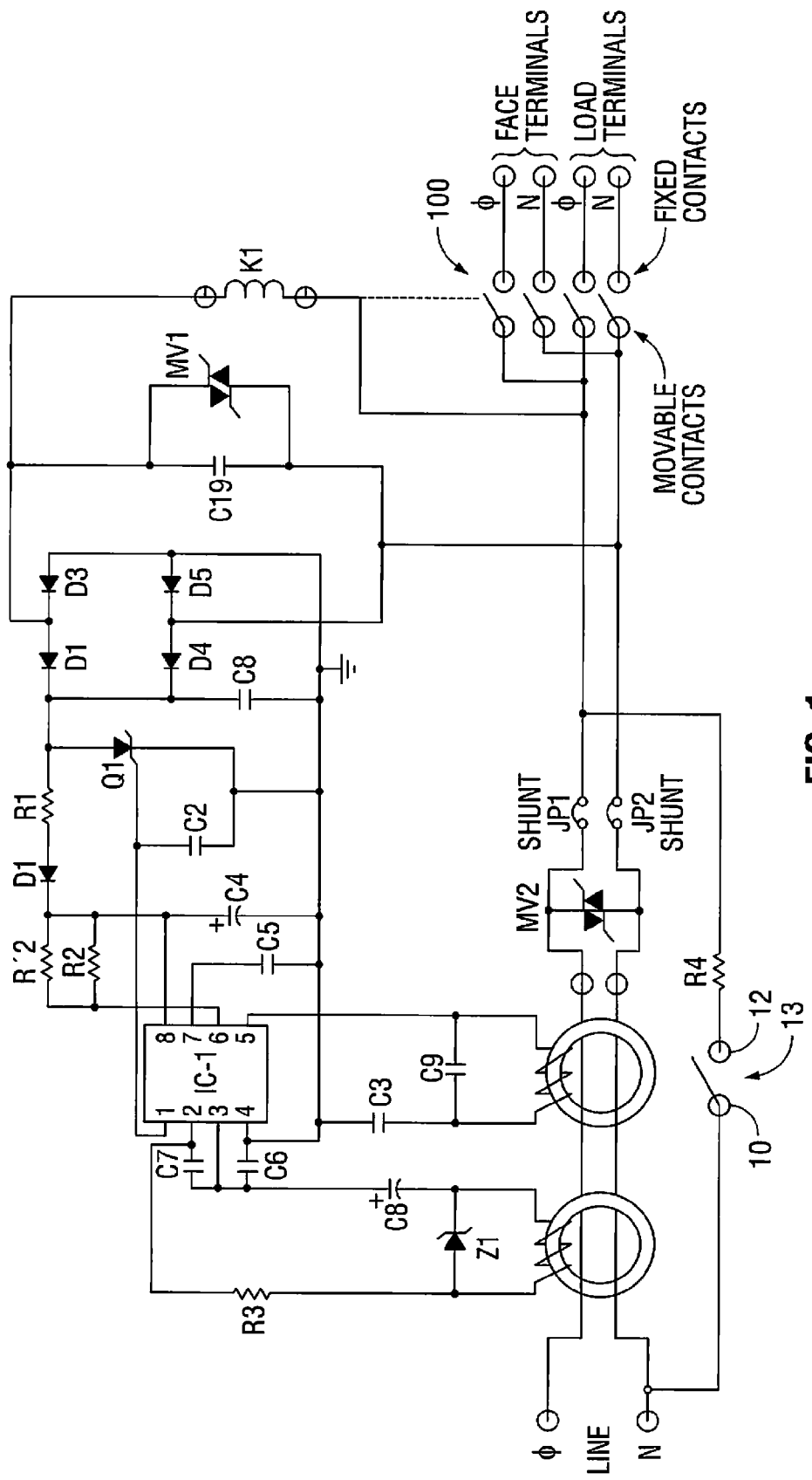
FIG. 1 shows a prior art sensing circuit in a circuit interrupting device.

The present invention contemplates various types of circuit interrupting devices that have at least one conductive path. The conductive path is typically located between the line side terminals that connect to a source of electrical power, load side terminals that connect to one or more loads and a user accessible load such as a receptacle that can receive a plug. The various devices in the family of resettable circuit interrupting devices comprise: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the network capacitor used in the circuit for interrupting devices shown in the drawings and described herein is incorporated into a GFCI device suitable for installation in a single gang junction box used in, for example, a residential electrical wiring system. However, the network capacitor according to the present invention can be included in any of the various devices in the family of resettable circuit interrupting devices identified above.

The present invention is best understood by comparison with a known circuit such as that shown in FIG. 1 where the illustrated circuit comprises a differential transformer, a Ground/Neutral (G/N) transformer, an integrated circuit (IC-1) for detecting a signal and generating a voltage, a full wave bridge rectifier (D2, D3, D4, and D5), first and second surge suppressor (MV1 and MV2) for absorbing extreme electrical energy levels that may be present at the line terminals, various filtering coupling capacitors (C2-C8), a gated semiconductor device (Q1), a relay coil (K1) and pairs of contacts 100, various current limiting resistors (R1-R4) and a voltage limiting Zener diode (Z1). The manually operated normally open switch 13 comprising movable contact 10 and stationary contact 12 is connected through resistor R4 across the phase and neutral conductors. Switch 100 has movable contacts and fixed contacts that connect the phase and neutral line terminals of a receptacle to the phase and neutral face receptacle and load terminals of the GFCI. The line, load and face terminals are electrically isolated from each other when the movable contacts 100 are open. When a predetermined condition, such as a ground fault, occurs the current through the phase and neutral conductors are not equal. This current difference is detected by the differential transformer and a voltage is fed to the integrated circuit chip IC-1. Integrated circuit chip IC-1 can be any one of integrated circuits typically used in ground fault circuits such as, for example, chip LM-1851 manufactured by National Semiconductor. In response to the signal provided by the differential transformer, integrated circuit IC-1 generates a voltage on pin 1 of IC-1 which is fed to the gate terminal of SCR, Q1. A full wave bridge comprising diodes D2-D5 has a DC terminal which is connected to the anode terminal the SCR. The occurrence of the voltage at pin 1 drives the SCR into its conductive state to allow current to pass through relay coil K1 which causes the movable contacts of switch 100 to separate from the fixed contacts, and power is removed from the user accessible load (face) terminals and load terminals. The relay coil K1 and contacts 100 may be implemented using a coil and plunger arrangement where the plunger, when operated, moves the movable contacts away from the fixed contacts. Relay coil K1 is also activated when switch 13 is manually closed. Closing switch 13 causes a current imbalance on the phase and neutral conductors which is detected by the differential transformer and provides a signal that is fed to integrated circuit chip IC-1 to activate relay K1.

The circuit of the GFCI can include a latching mechanism as disclosed in U.S. Pat. No. 6,246,558, (see FIG. 12, and the description which relates thereto) which is incorporated herein, in its entirety, by reference. Also, as shown in U.S. Pat. No. 6,246,558, the circuit allows the GFCI device to be reset after it has been tripped if a reset lockout has not been activated. In the tripped condition the line terminals, load terminals and face terminals are electrically isolated from each other. Thus, when the contacts 100 are open there is no power at the face terminals or the load terminals.

With this invention, the GFCI is placed into the stream of commerce in its tripped state, with the contacts 100 of the switch open and/or it is configured to cause electrical discontinuity in at least one of said phase or neutral conductive paths between said line side and said load side before being connected to a source of electricity for its intended purpose. Therefore, if the GFCI is reversed wired when first connected by an installer, there will be no power on the face terminals and the GFCI cannot be reset until the installer correctly wires the GFCI. The GFCI can include a coil and plunger assembly, latch plate and lifter assembly as shown in U.S. Pat. No. 6,246,558.

To overcoming the effects of RFI, a multilayer capacitor chip, also referred to as a network capacitor, is incorporated in the GFCI and is positioned at the input to the chip. The critical components of a GFCI that are sensitive to Radio Frequency Interference (RFI) is the Operational Amplifier (OA), differential transformer, silicon controlled rectifier (SCR), and the power supply. Depending on the application, a feed-through capacitor can be placed in sensitive locations to help suppress these interfering signals.

In general, network capacitors often include feed-through capacitors and other passive components which are integrated into a multilayer capacitor chip. Presently, there are feed-through capacitors that offer extremely stable capacitance over a wide range of frequencies such as, for example from 1 MHz to several GHz. The high-Q characteristics of the feed-through capacitors make them ideally suited for applications at microwave frequencies. Having a very low equivalent series resistance, they are capable of handing high current levels and, therefore, offer greater efficiency in DC to RF conversion. Furthermore, feed-through capacitors exhibit substantially no aging effects, very low drift, and maintain their characteristics over a large range of temperature, frequency and voltage.

As shown in FIGS. 2 and 3, feed-through capacitors and other passive components can be integrated into network capacitors or multilayer capacitor chips, NC1 and NC2. In particular, FIG. 2, NC1 illustrates an eight (8) pin network and FIG. 3, NC3 illustrates a six (6) pin network. Referring to FIG. 2, the schematic representation of the eight pin network capacitor chip NC1 includes a first, second and third capacitor, C20, C22, and C26; and feed-through capacitors C24 and C28 coupled as shown. Capacitor C20 is connected between terminals 2 and 3. Terminal 1 of the chip is left disconnected. Capacitor C22 is connected between a terminals 4 and 5 of the chip and capacitor C26 is connected between terminals 5 and 8. The terminal 4 is connected to terminal 5 through capacitor C22, and terminal 2 is connected to terminal 7 through feed-through capacitor C24. Terminal 3 is connected to terminal 6 through feed-through capacitor C28. Feed-through capacitor C24 is connected across terminals 2 and 7, and feed-through capacitor C28 is connected across terminals 3 and 6. The equivalent circuit of a standard capacitor, as shown in FIG. 4A, has a parasitic inductance Lp of approximately 1 nH. This inductance Lp reduces the self-resonant frequency of the capacitor C and, therefore, the frequency range over which it is effective as an EMI filter. Referring to FIG. 4B, there is shown the equivalent circuit of a feed-through capacitor. Feed-through capacitors, C24 and C28, through the arrangement of their electrodes and terminations, effectively transform about 70% of the detrimental shunt inductance into series inductance Ls, which forms a "T" filter with the capacitor.

A first effect of introducing the series inductance Ls and reducing the shunt inductance Lp is that there is a significant increase in the self-resonant frequency. Furthermore, there is a broadening and deepening in the frequency response curve, which substantially improves the feed-through capacitors, C24 and C28, usefulness as a noise filter. Moreover, the "T" structure, as shown in the equivalent circuit of FIG. 4B, makes it possible to obtain very useful EMI filtering.

Referring to FIG. 3, there is shown the schematic representation of a second embodiment of network capacitor NC2 having six pins or terminals and includes feed-through capacitors and capacitors connected as shown. Capacitor C30 is coupled between terminals 2 and 3 and feed-through capacitors C34 and C32 are connected to terminal 6. Terminals 2 and 4 are connected together and terminals 3 and 5 are connected together. Feed-through capacitor C32 is connected across terminals 2 and 4, and feed-through capacitor C34 is connected across terminals 3 and 5. Capacitor C36 is connected between terminals 1 and 6. Feed-through capacitors, C32 and C34, provide noise and EMI filtering.

Figure 5:
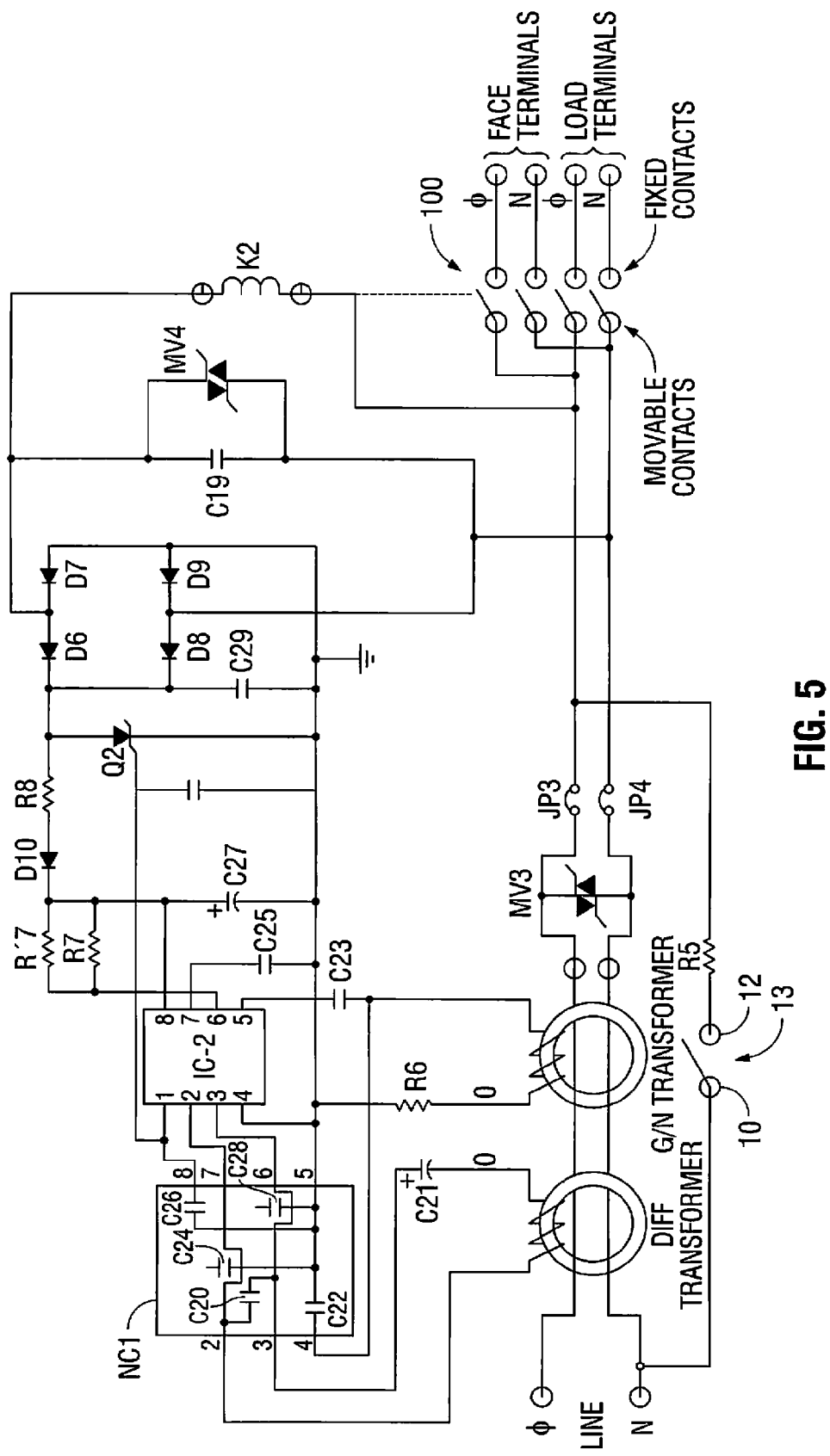
FIG. 5 shows the network capacitor of FIG. 2 in the circuit of a circuit interrupting device.

Referring to FIG. 5, the inclusive of the circuit of FIG. 2 into the circuit of a GFCI requires the relocation of some components of the known sensing circuit shown in FIG. 1. In particular, the sensing circuit of FIG. 5 comprises a differential transformer, a Ground/Neutral (G/N) transformer, a network capacitor NC1, an integrated circuit 1C-2 for detecting current and generating a voltage when a voltage differential between the phase and neutral conductors is detected, a full wave bridge rectifier D6, D7, D8, and D9, surge suppressor MV3 and MV4 for absorbing extreme electrical energy levels that may be present on the line terminals, various filtering coupling capacitors C19, C21, C23, C25, C27, and C29, an SCR (Q2), a relay coil (K2) and associated contacts 100, and various current limiting resistors R5-R8.

As shown, the phase and neutral line terminals are respectively connected to the phase and neutral wires of a 60 cycle AC power line as, for example, an electrical supply circuit leading from a fuse box in a residence or commercial building. Phase and neutral load terminals are respectively connected to contacts 100 which are open when relay coil K2 is energized. Similarly, the phase and neutral face terminals are connected to the contacts 100 which are open when relay coil K2 is energized. One set of contacts, a fixed contact and a movable contact, when closed provide electrical continuity from the phase line terminal to the phase face terminal, and a second set of contacts provide continuity between the neutral line terminal and the neutral face terminal. A third set of switches, when closed, provides electrical continuity between the phase line terminal and the phase load terminal, and a fourth set of contacts provides continuity between the neutral line terminal and the neutral load terminal.

Upon the occurrence of a ground fault, each set of contacts 100 open to interrupt the flow of current between the line phase and line neutral terminals to the load and face phase and neutral terminals.

The network NC1 shown in FIG. 2 is connected to the GFCI circuit as shown in FIG. 5. Capacitors, C20, C22, and C26, act as bypass capacitors which allow high frequency to be bypassed to ground which is connected to terminal 5. Capacitors, C20, C22, and C26, are discrete capacitors and capacitors, C24 and C28, are the feed-through capacitors. As shown, the fifth, sixth, seventh and eighth terminals of network capacitor NC1 are connected to the fourth, third, second and first input terminals respectively of integrated circuit IC-2.

Feed-through capacitors, C24 and C28, of network capacitor NC1 help to enhance RFI suppression. Each feed-through capacitor C24 and C28 is located to divert noise at each of the input terminals 2 and 4 of the operational amplifier which is on the integrated circuit IC-2 to ground.

It is to be noted that the circuit of FIG. 5 does not include the capacitors C3, C7, C8, and C9, the Zener diode Z1 and resistor R3 of the prior art circuit FIG. 1. In the prior art circuit shown in FIG. 1, AC coupling capacitor C6 at the input of the operational amplifier charges up when a signal appears from the differential transformer. Normally, when the impedance in the discharge path is high, coupling capacitor C6 discharges slowly. Without bleed off components, the only impedance in the discharge path of coupling capacitor C6 is the impedance of the inputs of the operational amplifier, which is normally very high. As such, coupling capacitor C6, at best, provides RF suppression. With the introduction of the inventive network capacitor NC1 shown in FIG. 2 into the circuit as shown in FIG. 5, the accumulated charge in the AC coupling feed-through capacitors C24 and C28 discharges rapidly. As a result, the operational amplifier in integrated circuit IC-2 is prevented from receiving false signals which can trip the circuit interrupting device caused by the remnant charge which is present at the prior art AC coupling capacitor C6 at the input of circuit IC-1.

The layout of the conductors and location of all components on the multilayer capacitor chip NC-1 board can affect RFI suppression. For example, the DC ground conductors should have relatively large widths. In addition, the DC ground is location sensitive. Ground loops are also important in enhancing RFI suppression and the distance between critical components should be kept to a minimum. Furthermore, filters and by-pass capacitors should be positioned as close to the sensitive component as possible.

Figure 6:
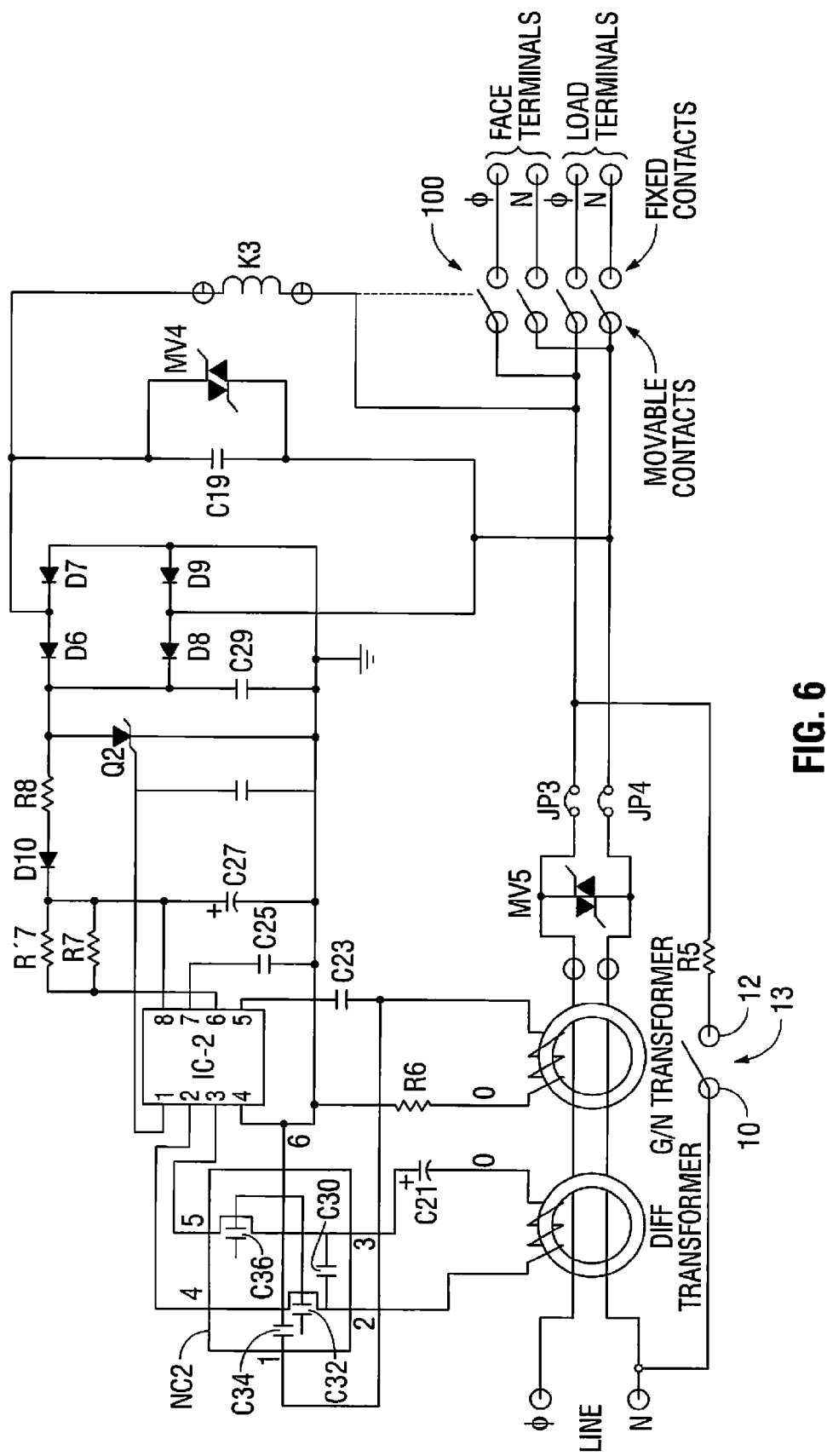
FIG. 6 shows the network capacitor of FIG. 3 in the circuit of a circuit interrupting device.

Referring to FIG. 6, there is shown a GFCI circuit having the second network capacitive NC2 embodiment (see FIG. 3) in accordance with the principles of the invention. The GFCI circuit of FIG. 6 comprises a differential transformer, a Ground/Neutral (G/N) transformer, network capacitor NC2, integrated circuit 1C-2, a full wave bridge rectifier D6, D7, D8, and D9, surge suppressor MV3 and MV4, capacitors C19, C21, C23, C25, C27, and C29, an SCR, Q2, a relay coil K2 and associate contacts 100, and various current limiting resistors R5-R8.

Capacitors, C30 and C34, are bypass capacitors which allow high frequency to be bypassed to ground. Capacitors C30 and C34 are not connected to the input of the operational amplifier in integrated circuit IC-2. Capacitors C32 and C36 are feed-through capacitors that help provide RFI suppression. The terminals 5, 6, 1 and 4 of capacitor network NC-2 are connected to terminals 3, 4, 5 and 2 of integrated circuit IC-2.

Feed-through capacitors, C30 and C36, of network capacitor NC2 help enhance RFI suppression. Each feed-through capacitor, C30 and C36, is located at a terminal of the operational amplifier in integrated circuit IC-3.

One distinction between the implementation of network capacitor NC2 shown in FIG. 6 as opposed to network capacitor NC1 shown in FIG. 5 is that network capacitor NC2 has less capacitors than network capacitor NC1.

Those skilled in the art will recognize that the physical location of the elements illustrated in FIG. 5 and can be moved or relocated while retaining the function desired. For example, a network capacitor, also referred to as multilayer capacitor chip can have a different configuration and be utilized to provide integrated enhanced RFI suppression within a sensing circuit. In addition, feed-through capacitors may be placed in any sensitive location to suppress interfering signals. Sensitive locations where feed-through capacitors, and hence, network capacitors, may be placed can include but are not limited to, the output of the operational amplifier, the power supply and the SCR-Gate terminal.

What is claimed is:

1. A circuit interrupting device comprising:
   a housing;
   a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
   a circuit interrupter disposed within said housing and configured to cause electrical discontinuity in said phase and neutral conductive paths between said line side and said load side upon the occurrence of a predetermined condition;
   said circuit interrupter further comprising a differential transformer coupled to said phase conductive path and said neutral conductive path;
   a multilayer capacitor chip coupled between said differential transformer and at least one input terminal of an integrated chip; and
   a reset button disposed at least partially within said housing.

2. The circuit interrupting device of claim 1, wherein said circuit interrupting device is configured to cause electrical discontinuity in at least one of said phase and neutral conductive paths between said line side and said load side before being connected to a source of electricity for use for its intended purpose.

3. A circuit interrupting device comprising:
   a housing;
   a first electrical conductive path disposed at least partially within said housing and terminating at a first connection, said first connection being capable of electrically connecting to a source of electricity;
   a second electrical conductive path disposed at least partially within said housing and terminating at a second connection, said second connection being capable of electrically connecting to at least one load when electrical continuity between said first and second electrical conductive paths is made;
   a third electrical conductive path disposed at least partially within said housing and terminating at a third connection, said third connection being capable of electrically connecting to at least one user accessible load when electrical continuity between said first and third electrical conductive paths is made;
   a circuit interrupter disposed within said housing and configured to break electrical continuity between said first and second conductive paths and between said first and third conductive paths upon the occurrence of a predetermined condition;
   said circuit interrupter further comprising a differential transformer coupled to phase and neutral conductors of said first conductive path;
   a multilayer capacitor chip coupled between said differential transformer and at least one input terminal of an integrated chip; and
   a reset button disposed at least partially within said housing.

4. A circuit interrupting device comprising:
   a housing;
   a first electrical conductive path for conducting electricity within said housing, and capable of electrically connecting to a source of electricity;
   second electrical conductive path for conducting electricity within said housing, and capable of electrically connecting to at least one load when electrical continuity between said first and second electrical conductive paths is made;
   a third electrical conductive path for conducting electricity within said housing, and capable of electrically connecting to at least one user accessible load when electrical continuity between said first and third electrical conductive paths is made;
   a circuit interrupter disposed within said housing for breaking electrical continuity between said first and second conductive paths and between said first and third conductive paths, upon the occurrence of a predetermined condition;

said circuit interrupter further comprising a differential transformer coupled to phase and neutral conductors of at least one of said conductive paths;

a multilayer capacitor chip coupled between said differential transformer and at least one input terminal of an integrated chip; and a reset button disposed at least partially within said housing.

5. A circuit interrupting system comprising:

a source of power;

a circuit interrupting device having fault protection at both line and load sides of said device, connected to said source of power;

at least one load connected to said circuit interrupting device;

wherein said circuit interrupting device comprises:

a housing;

a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;

a circuit interrupter disposed within said housing and configured to cause electrical discontinuity in said phase and neutral conductive paths at both said line side and said load side upon the occurrence of a predetermined condition;

said circuit interrupter further comprising a differential transformer coupled to phase and neutral conductive paths;

a multilayer capacitor chip coupled between said differential transformer and at least one input terminal of an integrated chip; and a reset button disposed at least partially within said housing.

6. The circuit interrupting device of claim 1, wherein said multilayer capacitor chip is coupled to an input terminal of an operational amplifier on said integrated chip.

7. The circuit interrupting device of claim 1, further comprising a reset lockout device that prevents reestablishing electrical continuity in said phase and neutral conductive paths if said circuit interrupter is non-operational, if an open neutral condition exists or if a reverse wiring condition exists.

8. The circuit interrupting device of claim 1, further comprising a latching mechanism to prevent resetting of the circuit interrupter under certain predefined conditions.

9. The circuit interrupting device of claim 3, wherein said multilayer capacitor chip is coupled to an input terminal of an operational amplifier on said integrated chip.

10. The circuit interrupting device of claim 3, further comprising a reset lockout device that prevents the making of electrical continuity between said first and second conductive paths and between said first and third conductive paths, if said circuit interrupter is non-operational.

11. The circuit interrupting device of claim 3, further comprising a latching mechanism to prevent resetting of the circuit interrupter under certain predefined conditions.

12. The circuit interrupting device of claim 4, wherein said multilayer capacitor chip is coupled to an input terminal of an operational amplifier on said integrated chip.

13. The circuit interrupting device of claim 4, further comprising a reset lockout device that prevents reestablishing electrical continuity between said first and second conductive paths and between said first and third conductive paths if said circuit interrupter is non-operational, if an open neutral condition exists or if a reverse wiring condition exists.

14. The circuit interrupting device of claim 4, further comprising a latching mechanism to prevent resetting of the circuit interrupter under certain predefined conditions.

15. The circuit interrupting system of claim 5, wherein said multilayer capacitor chip is coupled to an input terminal of an operational amplifier on said integrated chip.

16. The circuit interrupting system of claim 5, further comprising a reset lockout device that prevents reestablishing electrical continuity in said phase and neutral conductive paths if said circuit interrupting portion is non-operational or if an open neutral condition exists.

17. The circuit interrupting system of claim 5, further comprising a latching mechanism to prevent resetting of the circuit interrupter under certain predefined conditions.

18. A circuit interrupting device comprising:

a housing;

a circuit interrupter disposed within said housing and configured to cause electrical discontinuity in at least one conductive path between a line side and a load side upon the occurrence of a predetermined condition;

a multilayer capacitor chip coupled between a differential transformer and at least one input terminal of an integrated chip; and a reset button disposed at least partially within said housing.

19. The circuit interrupting device of claim 18, wherein said at least one conductive path includes a phase conductive path and a neutral conductive path each disposed at least partially within said housing between said line side and said load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load.

20. The circuit interrupting device of claim 18, wherein said differential transformer is coupled to said phase conductive path and said neutral conductive paths.

21. The circuit interrupting device of claim 18, wherein said circuit interrupting device is configured to cause electrical discontinuity in at least one of said phase and neutral conductive paths between said line side and said load side before being connected to a source of electricity for use for its intended purpose.

22. The circuit interrupting device of claim 18, wherein said multilayer capacitor chip is coupled to an input terminal of an operational amplifier on said integrated chip.

23. The circuit interrupting device of claim 19, further comprising a reset lockout device that prevents reestablishing electrical continuity in said phase and neutral conductive paths if said circuit interrupter is non-operational, if an open neutral condition exists or if a reverse wiring condition exists.

24. The circuit interrupting device of claim 1, further comprising a latching mechanism to prevent resetting of the circuit interrupter under certain predefined conditions.

25. A circuit interrupting system comprising:
   a source of power;
   a circuit interrupting device having fault protection at both line and load sides of said device, connected to said source of power;
   at least one load connected to said circuit interrupting device;
   wherein said circuit interrupting device comprises:
   a housing;
   a circuit interrupter disposed within said housing and configured to cause electrical discontinuity in at least one conductive path at at least one of a line side and a load side upon the occurrence of a predetermined condition;
   a multilayer capacitor chip coupled between a differential transformer and at least one input terminal of an integrated chip; and
   a reset button disposed at least partially within said housing.

26. The circuit interrupting system of claim 25, wherein the at least one conductive path includes a phase conductive path and a neutral conductive path each disposed at least partially within said housing between said line side and said load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load.

27. The circuit interrupting system of claim 25, wherein said multilayer capacitor chip is coupled to an input terminal of an operational amplifier on said integrated chip.

28. The circuit interrupting system of claim 26, further comprising a reset lockout device that prevents reestablishing electrical continuity in said phase and neutral conductive paths if said circuit interrupting portion is non-operational or if an open neutral condition exists.

29. The circuit interrupting system of claim 25, further comprising a latching mechanism to prevent resetting of the circuit interrupter under certain predefined conditions.

* * * * *